Mar. 20, 1923.  
S. LÉ F. VARVEL.  
MEANS FOR DETECTING AND INDICATING DEFECTIVE SPARKING PLUGS IN THE IGNITION SYSTEMS OF INTERNAL COMBUSTION ENGINES.  
FILED JAN. 7, 1920.

1,448,951.

INVENTOR
SIDNEY LeFevre VARVEL
By
HIS ATTORNEY

Patented Mar. 20, 1923.

1,448,951

UNITED STATES PATENT OFFICE.

SIDNEY LÉ FÈVRE VARVEL, OF HORNSBY, NEAR SYDNEY, NEW SOUTH WALES, AUSTRALIA.

MEANS FOR DETECTING AND INDICATING DEFECTIVE SPARKING PLUGS IN THE IGNITION SYSTEMS OF INTERNAL-COMBUSTION ENGINES.

Application filed January 7, 1920. Serial No. 349,968.

*To all whom it may concern:*

Be it known that I, SIDNEY LÉ FÈVRE VARVEL, a subject of the King of Great Britain and Ireland, residing at Mount Errington, Hornsby, near Sydney, State of New South Wales, Australia, have invented certain new and useful improvements in means for detecting and indicating defective sparking plugs in the ignition systems of internal-combustion engines, of which the following is a specification.

This invention relates to means for detecting faulty sparking plugs in high tension electric ignition systems which are used for the purpose of inflaming, by sparks, which are created across the plug points at proper intervals, combustible charges which are fed to internal combustion engines. The invention is applicable for use either as a fitting to the dashboard or other suitable part of an automobile or other vehicle within easy reach of the driver, by means of which he may be able to test the plugs for the purpose of ascertaining whether they are sparking or not, or it may consist of a separate device capable of being carried by the driver and used by him at will, when he desires to test one or more of a series of sparking plugs in the ignition system of the engine for the same purpose.

Figure 1:
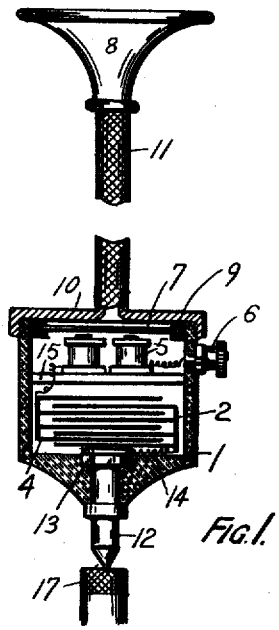
Figure 2:
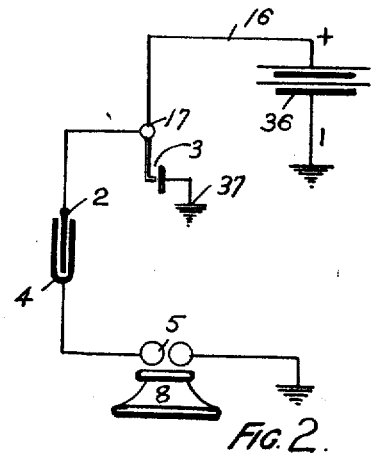
Figure 3:
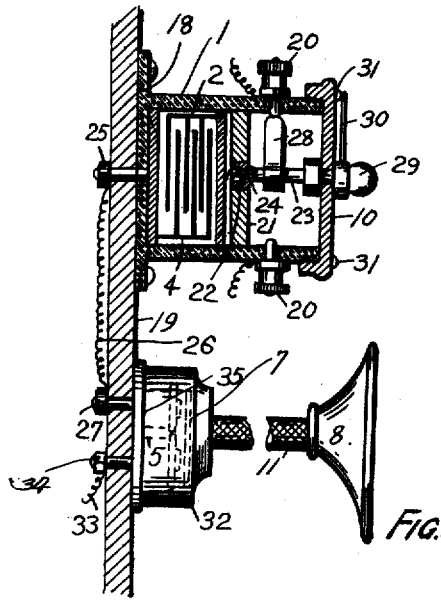

In the accompanying drawings, Fig. 1 is a sectional elevational view showing a detector in accordance with the invention, when it is to be used as an independent testing device for sparking plugs; Fig. 2 is a diagrammatic view corresponding with Fig. 1; Fig. 3 is a sectional elevational view, showing a detector which is usable as a fitting to an automobile dashboard; and Fig. 4 is a diagrammatic view corresponding therewith.

Referring to Figs. 1 and 2, the casing 1 may be of rectangular, circular, or any other convenient shape. It may be constructed of mica or ebonite or other suitable insulating material, or it may be constructed of metal suitably insulated. In this casing is mounted a condenser, the conductors and dielectrics of which are disposed alternately of each other, and arranged so that one half of them 2 will be in electrical connection with the insulated portion 16 of the high tension circuit of a sparking plug 3, whilst the other half 4 of the plates or sheets of the condenser will be connected to the electro-magnets 5, which are connected to earth, through the terminal 6 on the side of the casing 1. The diaphragm 7 of the telephone receiver 8 is carried at its ends in the ring 9, mounted in the casing 1; the latter is provided with the cover 10, to which the end of the flexible tube 11 of the receiver 8 is fitted. In the lower end of the casing is the metal pin 12 which is adapted to be brought into contact with the terminal 17 of a sparking plug which is to be tested. As this pin is to convey current from the insulated portion 16 of the high tension circuit to the portion 2 of the condenser which is connected to the pin, it must be suitably insulated from the casing 1 if the latter is made of metal. At its inner end the pin 12 is furnished with a terminal 13 to which the wire 14 is connected and leads to the sheets or plates 2 of the condenser. The septum 15 carrying the electro-magnets 5 must be constructed of non-magnetizable material.

Figure 4:
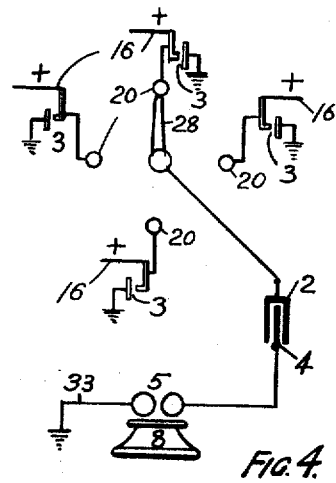

With reference to Figs. 3 and 4 of the drawings, the casing 1 in Fig. 3 is constructed similarly to the casing shown in Fig. 1, but its rear wall 18 is flanged and is fastened to the dashboard 19 of a vehicle. The series of plates 2 and 4 of the condenser are disposed and arranged in a manner similar to the condenser shown in Fig. 1. In the side walls of the casing 1 are mounted a number of terminals 20, depending on the number of spark plugs which are to be connected to the detector. Within the casing is an insulated partition 21 having centrally thereof a metal block 22 one side of which is in contact with the rotatable spindle 23. The spring 24 contacts at one end with the opposite side of the metal block 22 and its other end is in contact with the foremost conductor plate or sheet of the portion 2 of the condenser. This portion of the condenser is capable of being brought into electrical connection with the insulated portion 16 of the high tension circuit, whilst the other portion 4 of the condenser is connected to the telephone receiver 8 through the insulated terminal 25, wire 26, and insulated terminal 27. On the spindle 23 is mounted the metal finger 28; this spindle is insulated at its outer end and carries an insulated turning knob 29 and a pointer 30. The cover 10 of the casing is provided with a series of indicator points 31 corresponding with the number of terminals 20 which are fitted to the casing. Upon turning the knob 29 the pointer 30 may be made to register with any one of the series of indicator points 31. These points are arranged on the outer face of the cover 10 in such position that they will serve to indicate when the finger 28 has been brought into contact with the inner ends of any one of the terminals 20. As the latter terminals are connected to the insulated portion 16 of the high tension circuit part of the current of that circuit will be conveyed to the portion 2 of the condenser through the finger 28, the spindle 23, metal block 22 and spring 24 when the finger is in contact with any one of the series of terminals 20. It is therefore possible to test any one of a series of sparking plugs, each of which is electrically connected to the separate terminals 20, by rotating the insulated knob 29, so as to cause the finger 28 to make contact respectively with each of the inner ends of said terminals, when it is desired to ascertain whether the sparking plugs are sparking or not. The electro-magnets 5 of the telephone receiver 8 are mounted on an insulated plate 35 affixed to the dashboard 19, and the electro-magnets and the diaphragm 7 are enclosed in a casing 32 to which the inner end of the flexible tube 11 of the receiver is detachably fastened. A wire 33 leading from the terminal 34 connects the telephone receiver to earth.

In Fig. 2 of the drawings, the source of current is shown as a battery 36 and a wire 16 is led therefrom to the terminal 17 of the insulated side of a sparking plug 3, whilst the other side of the sparking plug is earthed at 37; the circuit in which the condenser and the telephone receiver are arranged is connected in parallel with the insulated portion 16 of the high tension circuit about the terminal 17. It will be understood that the invention is applicable to high tension circuits to which current is supplied from a magneto, or a battery or accumulator and an induction coil, or in connection with systems of dual ignition where the latter are employed, or other suitable ignition systems capable of furnishing high tension current to sparking plugs for the purpose of inflaming combustible charges in internal combustion engines.

In operation, when high tension current is supplied to either the pin terminal 12 or any one of the terminals 20 which are connected to the portion 2 of the condenser, and the sparking plug to which these terminals are connected are in order, and sparking is capable of occurring across their spark points, the movements imparted to the diaphragm 7 are heard distinctly in the telephone receiver. If, however, the sparking points of the sparking plugs are defective no sound will be transmitted to the receiver 8, if sparks are not created across the spark points of the plugs; and only intermittent sounds will be heard in the receiver, if sparking only occurs intermittently across such points.

I wish it to be understood that the means which I have described herein and illustrated in the drawings may be modified within limits without departing from the spirit of the invention. Such means may be modified to adapt the invention to particular uses so long as the essential features of the invention herein described are retained.

What I claim as my invention and desire to secure by Letters Patent is:—

1. Means for detecting faulty sparking plugs in high tension electric ignition circuits of internal combustion engines, comprising an insulated casing, a condenser within said casing, a telephone receiver having windings and associated with said casing the diaphragm of which is mounted within said casing, one terminal of said windings being connected to the condenser and the other to the earth, and an insulated metal pin terminal affixed to said casing adapted to electrically connect one portion of said condenser to the insulated side of the circuit of the spark points of a sparking plug.

2. Means for detecting faulty sparking plugs in high tension electric ignition circuits of internal combustion engines, comprising an insulated casing having thereon a series of terminals adapted to be wired to the insulated side of the high tension circuit of the spark points of the sparking plugs and a series of indicator points corresponding in number with said terminals, a condenser within said casing, a telephone receiver adapted to be brought into electrical communication with one portion of said condenser and also to be connected to earth, a rotatable metal spindle mounted within said casing and carrying an insulated knob and a pointer on its projecting outer end, a metal finger on said spindle adapted to contact with the respective inner ends of said terminals when said spindle is rotated, a metal plate carried in an insulated partition within said casing and in contact at one side with the inner end of said spindle, and a metal spring contacting at one end with the opposite side of said plate and at the other end with the other portion of sand condenser and adapted to deliver high tension current conveyed to said plate to said condenser.

In testimony whereof I have affixed my signature.

SIDNEY LÉ FÈVRE VARVEL.